Feb. 14, 1961 J. U. TORRES 2,971,781
FLEXIBLE COUPLING FOR BEADED END TUBING
Filed Feb. 4, 1957 2 Sheets-Sheet 1
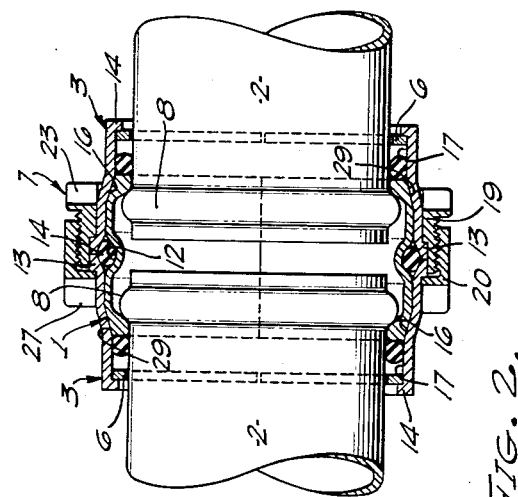
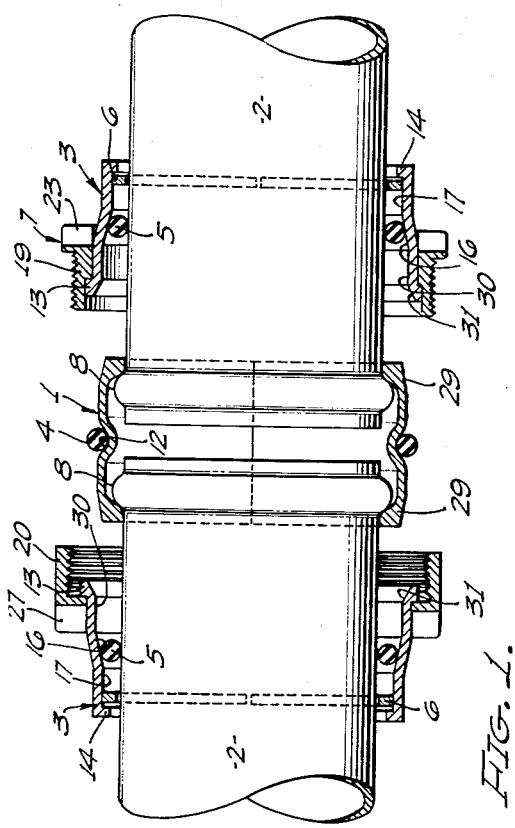
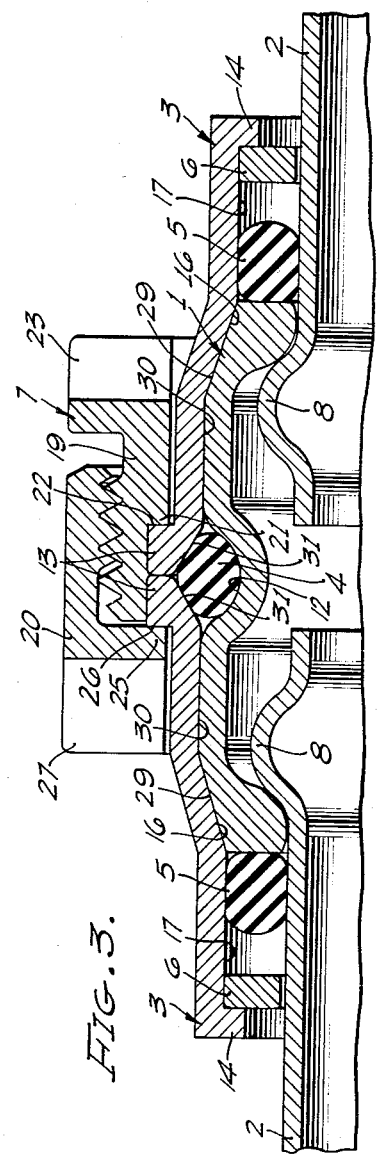
INVENTOR.
JORGE U. TORRES
BY
Paul A. Weilein
ATTORNEY Feb. 14, 1961          J. U. TORRES          2,971,781
FLEXIBLE COUPLING FOR BEADED END TUBING
Filed Feb. 4, 1957          2 Sheets-Sheet 2
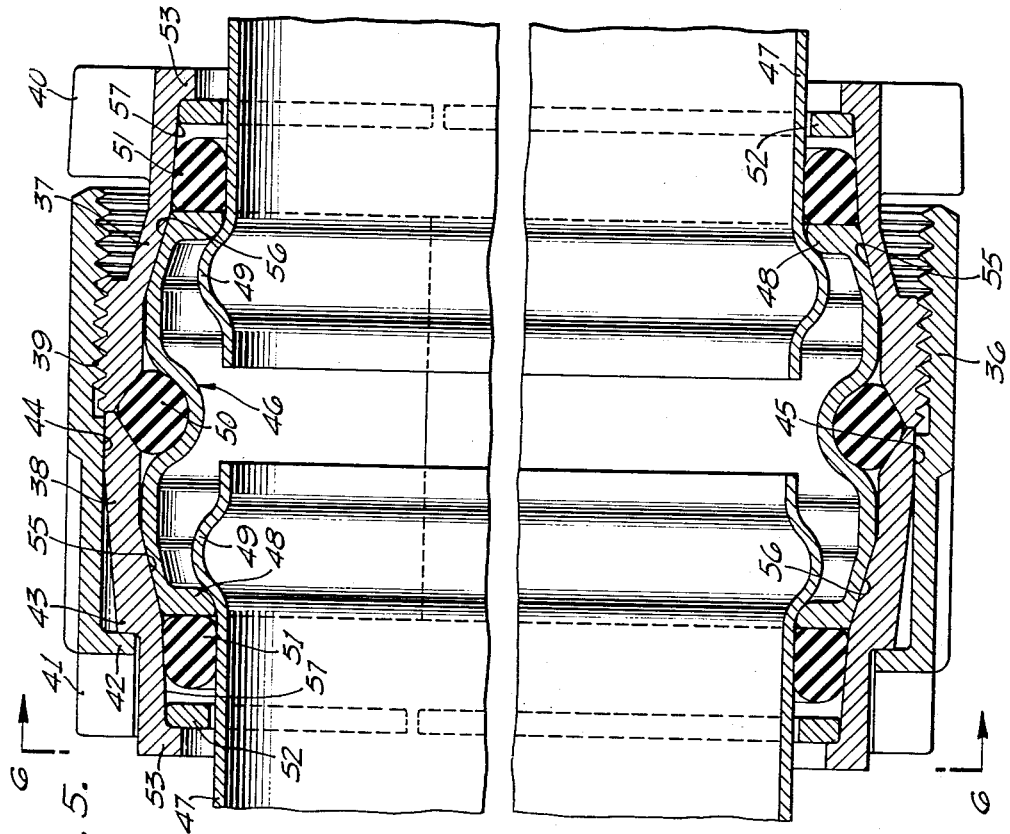
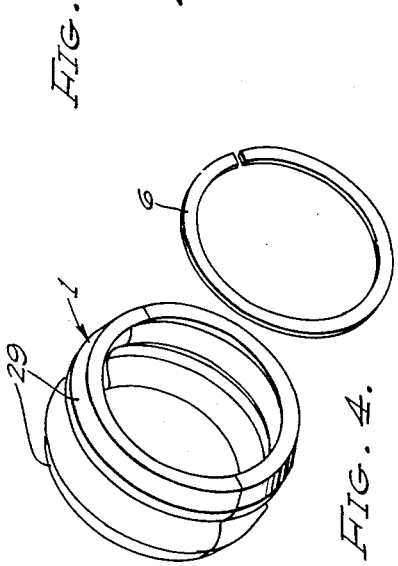
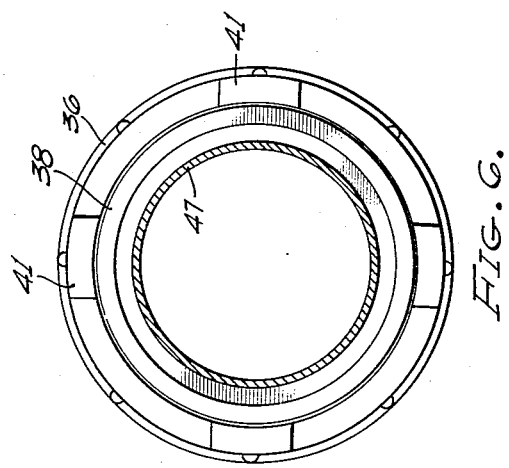
INVENTOR.
JORGE U. TORRES
BY
Paul A. Weilein
ATTORNEY

United States Patent Office 2,971,781
Patented Feb. 14, 1961

2,971,781

FLEXIBLE COUPLING FOR BEADED END TUBING

Jorge U. Torres, Los Angeles, Calif., assignor to E. B. Wiggins Oil Tool Company, Inc., Los Angeles, Calif., a corporation of California Filed Feb. 4, 1957, Ser. No. 638,069

15 Claims. (Cl. 285—233)

This invention relates to couplings for tubing and similar conduits, particularly tubing and conduits having beaded ends.

It is an object of the present invention to provide an improved coupling of the character described which will permit free flexure in any direction as well as limited misalignment and relative axial movement of the connected ends of the tubing while maintaining a fluid tight joint.

It is another object of this invention to provide a coupling such as above described which is light as to weight, easy to assemble and disassemble and reliable in operation.

It is an additional object of the invention to provide a flexible coupling such as described which will maintain a fluid tight seal under extreme high and low temperatures as well as under extreme positive and negative internal pressures up to the burst limits of the tubing.

It is another object of this invention to provide a coupling such as described in which a novel arrangement of sealing rings and coupling parts make it possible to provide the desired sealing action without imposing any stresses or forces on the sealing rings which would mutilate the rings or impair the sealing action thereof.

It is a further object hereof to provide a coupling such as described in which the coupling parts may be quickly assembled and secured in the desired joint-forming positions without transmitting to the tubing or the rings torque which would damage or weaken these parts, and without interfering with the freedom of flexibility of the joint, thus enabling relative axial movement and axial misalignment of the tubing ends.

An additional object hereof is the provision of couplings of the character described wherein the sealing rings provide the desired sealing action by being radially compressed in a manner preventing the damaging of the rings in repeated assembling and disassembling of the coupling.

A further object is the provision in a coupling such as described of a novel securing means which readily and easily may be operated to move parts of the coupling and sealing rings into the desired joint-forming and sealing relation and to releasably hold the coupling parts and rings in the desired positions without transmitting damaging torque to the tubing or the rings.

Another object of this invention is the provision of a coupling such as described which is constructed and arranged to provide the desired flexible and fluid-tight joint between the tubes or conduits having extruded end beads of the usual radius in cross section as well as and between tubing or conduits having machined beads.

This invention possesses many other advantages and has other objects which may be made more easily apparent from a consideration of the embodiments of the invention shown in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1 is a longitudinal sectional view of a coupling embodying the present invention, showing the parts of the coupling and the sealing rings in position to be assembled on the beaded ends of tubing;

Fig. 2 is a sectional view showing the coupling assembled to form a flexible fluid tight joint of the beaded ends of the tubing;

Fig. 3 is a fragmentary sectional view on an enlarged scale of the assembled coupling;

Fig. 4 is an exploded perspective view of parts of the coupling;

Fig. 5 is a sectional view of a modified form of the coupling; and

Fig. 6 is a sectional view taken on the line 6—6 of Fig. 5.

As shown in the accompanying drawing, a flexible coupling embodying the present invention generally includes a tubular coupling member 1 of suitable light and strong metal for embracing and holding against axial separation the beaded ends of tubing or conduits 2, a pair of sleeves 3 of similar metal for embracing and holding in place the coupling member, a resilient compressible sealing ring 4 for forming a seal between the sleeves 3 and the coupling member 1, resilient compressible sealing rings 5 for forming seals between the sleeves 3 and the tubing 2; split metal rings 6 cooperable with the sleeves 3 to prevent displacement of the sealing rings 5, and securing means 7 cooperable with sleeves 3 to releasably secure the coupling parts in assembled relation on the beaded ends of the tubing 2.

In accordance with this invention the tubular coupling member 1 is constructed and arranged so that it may be moved over the beaded ends of the tubing 2 in embracing and contacting relation with the beads 8 only, with the remainder of the coupling member circumferentially spaced from the tubing 2. Accordingly, the coupling member 1 is sectional, being here shown as made of semi-cylindrical portions or halves adapted to be assembled over the beaded ends of the tubing.

For the purpose of engaging the beads 8 only, so that the remainder of the coupling member 1 will be circumferentially spaced from the tubing to permit free flexure of the tubing, the member 1 is provided at its outer ends with inwardly directed, enlarged, bead-engaging portions or flanges 9 having rounded or curved bead engaging surfaces. These curved surfaces contact the correspondingly curved surfaces of the beads in a manner restraining axial separation of the beaded ends while permitting free flexure of the tubing. As a result of this construction, the sectional coupling member 1 constitutes an arched bridge member subject to being readily assembled over the beaded ends so as to engage the beads only and form a strong dependable joint.

With reference to Fig. 1, it will be apparent that the sleeves 3 with the securing means 7 thereon, the split rings 6 and sealing rings 5 are assembled on the respective ends of the tubing 2 before the sectional coupling member 1 is assembled over the beaded ends of the tubing. The split in the rings 6, the elasticity of the sealing rings 5 and the large inside diameter of the sleeves 3 makes it possible readily to move these parts over the beads 8.

The sealing ring 4 may be employed to hold the sectional coupling member 1 assembled over the beaded ends of the tubing. This may be accomplished by placing the sealing ring 4 around the assembled halves of the coupling member 1 as shown in Fig. 1. The elasticity of the ring 4 makes it possible to so position the sealing ring in a circumferential external groove 12 in the coupling member whereby the ring will be retained on the coupling member.

The sleeves 3 are provided with radially outwardly extending end flanges 13 at opposed ends and with radially inwardly directed flanges 14 at their outer ends. The flanges 14 are adapted to surround the tubing in circumferentially spaced relation thereto. The inside diameter of the sleeves is such that the flanges 14 will clear the beads 8 in moving the sleeves over the beads onto the tubing. This spacing of the flanges 14 is such that the split rings 6 are required to form with the flanges 14 an annular obstruction preventing axial displacement of the sealing rings 5. However, the inside diameter of the rings 6 is such that a clearance is provided about the tubing sections 2, thus enabling limited axial misalignment of the tubing ends without interfering with assembly of the coupling or with effective sealing during use.

Means are provided for securing the sleeves 3 in place around the coupling member. In the present invention this means is operable to move the sleeves axially toward one another in such a manner that the sealing rings 5 will be progressively radially compressed between tapered surfaces 16 interiorly of the sleeves 3 and the surface of the tubing 2 opposed to the surfaces 16. The surfaces 16 are spaced from the end portions of the sleeves on which the flanges 14 are mounted. The inner surfaces 17 of the sleeves between the flanges 14 and the inclined surfaces 16, as shown in Figs. 1 and 2, are parallel with the surfaces of the tubing opposed thereto. Thus, when the sleeves 3 are moved axially toward one another, the sealing rings 5 are first radially compressed by the inclined surfaces 16 and then engaged and held in a compressed state by the surfaces 17, thereby forming the desired seal between the sleeves 3 and the tubing 2.

As here shown, the securing means 7 comprises a pair of screw threaded securing rings or collars 19 and 20. The ring 19 is externally screw threaded and provided with an annular shoulder 21 for abutting a shoulder 22 formed by the flange 13 on one of the sleeves 3. The ring 19 is also provided with a suitable formation 23 to accommodate a spanner wrench or similar tool, not shown, which may be used for turning the ring 19. The ring 20 is provided with internal screw threads and adapted to encompass the ring 19. A flange or shoulder 25 interiorly of the ring 20 engages a shoulder 26 formed by the flange 13 on the other coupling member. The ring 20 is also provided with a formation 27 to accommodate a suitable tool for manipulating the ring 20 in threadedly coupling the two rings 19 and 20. Since the rings 19 and 20 are carried by and engage the sleeves 3, as above noted, it is apparent that upon threadedly connecting these rings and screwing them together, the sleeves 3 will be moved axially toward one another so as to surround the coupling member 1.

It is desired to bring about engagement of the interior of the sleeves 3 with the exterior of the coupling member 1 in a manner which will assure the proper compression and sealing action of the sealing rings 4 and 5, and preclude the transmission of torque or other forces which would deform the tubing or damage or impair the sealing rings. In consequence, the inclined surface 16 of the sleeves are positioned to engage correspondingly inclined surfaces 29 exteriorly of the coupling member 1 to limit axial movement of the sleeve relative to the coupling member. The flanged ends 13 of the sleeve may abut one another when the inclined surfaces 16 and 29 meet as shown in Fig. 2, or the flanges 13 may be foreshortened axially so that they do not necessarily abut. This will allow for greater manufacturing tolerances in the fabrication of the sleeves 3 and the coupling member 1.

The sleeves 3 are enlarged as to diameter as at 30 so as to freely fit over the ends of the member 1. The opposed ends of these sleeves 3 are provided with beveled surfaces 31 adapted to engage the O-ring 4 and compress it in the groove or seat 12 in the member 1, thus affording a seal at this juncture.

It should be noted that only a small part of the screw threaded ring 19 rests upon the outer perimeter of the abutting flanges 13 on the sleeves 3, the remainder of the ring 19 and all of the ring 20 being spaced circumferentially from the sleeves 3. Thus upon turning the rings 19 and 20 to screw them together, no appreciable torque is transmitted to the sleeves 3 and no torque which would derange or damage the sealing rings 4 and 5 and the tubing, is transmitted thereto. The main force applied by the rings 19 and 20 to the sleeves 3 is an axial force transmitted by the mutually engaging shoulders on the rings 19 and 20 and the two sleeves respectively.

In the operation of threadedly coupling the rings 19 and 20 either ring may be held and the other turned or both appropriately turned to screw them together, there being no damaging torque applied to the sealing rings or the tubing in either case.

While the rings 19 and 20 are here shown as the means for bringing the sleeves together and holding them in operative position it is to be understood that any means capable of these functions may be employed as within the concept of this invention.

It should be noted that the split rings 6 are stressed so that when disposed on the tubing, they will expand radially into engagement with the inner surfaces of the sleeves 3 and become circumferentially spaced from the tubing. This will permit of the desired flexure of the tubing, the tubing fulcruming on the sealing rings 5. The contacting rounded surfaces of the portions 9 and beads 8 respectively permit of free flexure of the tubing in any direction. Moreover, the interior of the coupling member 1 adjacent the portions 9 is contoured so that the bead engaging portions 9 will effect the desired contact with beads of various form, for example machined beads such as found on certain type of tubing.

A modified form of this invention, as shown in Figs. 5 and 6 differs from the form shown in Figs. 1-4 in that but a single screw threaded securing ring 36 is employed, and in that one of the two sleeves 37 and 38 corresponding to the two sleeves 3 shown in Figs. 1-4, is provided with the external screw threads 39 for cooperation with the internal screw threads on the ring 36. The screw threaded sleeve 37 is also provided with a suitable wrench-accommodating formation 40 so that it may be held while the screw threaded ring 36, likewise provided with a wrench-accommodating formation 41, is manipulated into threaded engagement with the screw threads 39. The ring 36 is provided with an inwardly directed flange 42 for engaging a shoulder 43 on the other sleeve 38 whereby the screwing of the ring 36 onto the sleeve 37 will draw the two sleeves together to hold the coupling assembled in the same manner as the coupling shown in Figs. 1-4. The ring 36 has an annular internal centering surface 44 which rests upon a similar centering surface 45 on the sleeve 38, the ring being otherwise spaced from the sleeve 38 except for the flange 42.

Other than above noted, this modified form of the coupling includes a tubular coupling member 46 for embracing the beaded ends of tubing 47, inwardly directed rounded flanges 48 on the member 46 for engaging the beads 49 on the tubing, a sealing ring 50 on the member 46, a pair of sealing rings 51, a pair of split rings 52 and inwardly directed end flanges 53 on the sleeves, all constructed and arranged in the same manner as the corresponding parts shown in Figs. 1-4.

This modified form of the invention is assembled on the tubing in the same manner as shown in Fig. 1 except that the ring 36 is screwed onto the screw threads 39 on the sleeve 37 while the latter is held by a suitable tool or wrench. This holding of the sleeve 37 while turning the ring 36 makes it possible to move the sleeves 37 and 38 in properly assembled relation holding the coupling member 46 in place and radially compressing and positioning the sealing rings 50 and 51 in the proper manner, without transmitting damaging torque to the tubing or the rings.

The sleeves 37 and 38 are provided with tapered surfaces 55 for engaging tapered surfaces 56 in the coupling member 46 to limit axial movement of the sleeves toward one another. If desired, the sleeves 37 and 38 may, as here shown, be provided with tapered surfaces 57 for engaging the sealing rings 51 so that as the sleeves are moved together in the tightening of the ring 36, the sealing rings 51 will be further compressed radially between the tapered surfaces 57 and the tubing 47.

This modified form of the invention may be preferred for some applications inasmuch as it has but one screw threaded securing ring and therefore reduces the overall diameter of the coupling somewhat as well as the weight of the unit. It provides all of the advantages of the coupling shown in Fig. 1, except the provision for turning either or both of the screw threaded parts in the operation of assembly of the coupling on the tubing.

I claim:

1. A coupling for forming a flexible fluid tight joint between the beaded ends of tubing comprising: a tubular coupling member for surrounding said beaded ends; said coupling member having inwardly directed portions for engaging the beads on said ends to preclude axial separation of said ends; a pair of sleeves having an inside diameter permitting free axial movement of said sleeves over said beaded ends and movement of said sleeves into axially opposed relation over said coupling member; sealing rings adapted to be mounted on said tubing; said sleeves having inclined internal surfaces extending longitudinally thereof arranged to radially compress said rings against said tubing during movement of said sleeves over said coupling member; said coupling member having inclined surfaces extending longitudinally from the ends thereof for contacting said inclined surfaces of said sleeves; said sleeves having end portions adapted to extend outwardly from the ends of said coupling member; said end portions having internal surfaces contiguous said inclined surfaces of said sleeves arranged to radially compress said rings against said tubing; and securing means engageable with said sleeves for holding said sleeves in place on said coupling member.

2. A coupling for forming a flexible fluid tight joint between the beaded ends of tubing comprising: a tubular coupling member for surrounding said beaded ends; said coupling member having inwardly directed portions for engaging the beads on said ends to preclude axial separation of said ends; a pair of sleeves having an inside diameter permitting free axial movement of said sleeves over said beaded ends and movement of said sleeves into axially opposed relation over said coupling member; said sleeves and said coupling member having opposed surfaces mutually engageable to limit relative axial movement between said sleeves and said coupling member; sealing rings adapted to be mounted on the tubing in opposed relation to ends of said coupling member; said surfaces of said coupling member being at the end portions of said coupling member; said surfaces of said sleeves extending longitudinally thereof and disposed to radially compress said rings upon movement of said sleeves over said coupling member; said sleeves having other surfaces extending longitudinally from the ends thereof and contiguous to said first-named surfaces of said sleeves for radially compressing the rings against said tubing at points between the ends of said sleeves and the ends of said coupling member; and securing means engageable with said sleeves for holding said sleeves in place on said coupling member.

3. A coupling for forming a flexible fluid tight joint between the beaded ends of tubing comprising: a tubular coupling member for surrounding said beaded ends; said coupling member having inwardly directed portions for engaging the beads on said ends to preclude axial separation of said ends; a pair of sleeves having an inside diameter permitting free axial movement of said sleeves over said beaded ends and movement of said sleeves into axially opposed relation over said coupling member; sealing rings adapted to be mounted on said tubing; said sleeves having inclined internal surfaces extending longitudinally thereof arranged to radially compress said rings against said tubing during movement of said sleeves over said coupling member; said coupling member having inclined surfaces extending longitudinally from the ends thereof for contacting said inclined surfaces of said sleeves; said sleeves having end portions adapted to extend outwardly from the ends of said coupling member; said end portions having internal surfaces contiguous said inclined surfaces of said sleeves arranged to radially compress said rings against said tubing; means on said sleeves projecting radially inwardly from said internal surfaces for preventing axial dislodgment of said last named sealing rings; and securing means engaging said sleeves to urge said sleeves toward one another for securing said sleeves and coupling member in assembled relation in said beaded ends.

4. A coupling for forming a flexible fluid tight joint between the beaded ends of tubing comprising: a tubular coupling member for surrounding said beaded ends; said coupling member having inward.y directed portions for engaging the beads on said ends to preclude axial separation of said ends; a pair of sleeves having an inside diameter permitting free axial movement of said sleeves over said beaded ends and movement of said sleeves into axially opposed relation over said coupling member; a pair of sealing rings adapted to be mounted on said tubing in opposed relation to ends of said coupling member; a pair of split rings adapted to be mounted in surrounding relation to said tubing between the ends of said sleeves and said sealing rings; said sleeves having flanges on the ends thereof for engaging and retaining said split rings between said tubing and said sleeves; said sleeves having inclined surfaces extending longitudinally of the interior thereof arranged to radially compress said sealing rings against said tubing; said coupling member having inclined surfaces extending longitudinally from the ends thereof for contacting said inclined surfaces of said sleeves; said sleeves having end portions extending axially from the ends of said coupling member; said end portions having surfaces opposed to said tubing for compressing said rings against said tubing at points axially spaced from the ends of said coupling member; and securing means for engaging said sleeves and movable relative thereto for moving said sleeves together over said coupling member.

5. A coupling for forming a flexible fluid tight joint between the beaded ends of tubing comprising: a tubular coupling member for surrounding said beaded ends; said coupling member having inwardly directed portions for engaging the beads on said ends to preclude axial separation of said ends; a pair of sleeves having an inside diameter permitting free axial movement of said sleeves over said beaded ends and movement of said sleeves into axially opposed relation over said coupling member; said coupling member having a circumferential exernal groove; a sealing ring mounted in said groove to form a seal between said sleeves and said coupling member; sealing rings adapted to be mounted on said tubing; said sleeves having inclined internal surfaces extending longitudinally between the ends thereof for radially compressing said last-named sealing rings adjacent said tubing upon movement of said sleeves over said coupling member; said coupling member having inclined surfaces extending longitudinally from opposite ends thereof for engaging said inclined surfaces of said sleeves; said sleeves having end portions which extend axially from said ends of said coupling member; said end portions having surfaces extending longitudinally thereof so as to merge with the inclined surfaces of the sleeves and to further radially compress said last-named rings against said tubing following said compression by said inclined surfaces of said sleeves; flanges on said sleeves; split rings adapted to surround said tubing between said flanges and said last-named sealing rings; and rotative securing means engageable with said sleeves in surrounding relation thereto and operable to move said sleeves axially toward one another into holding engagement with said coupling member.

6. A coupling for forming a flexible fluid tight joint between the beaded ends of tubing comprising: a coupling member for surrounding said beaded ends; said coupling member being formed of arcuate sections adapted to be assembled as a tube around said beaded ends; said coupling member having inwardly directed portions for engaging the beads on said ends to preclude axial separation of said ends; a pair of sleeves having an inside diameter permitting free axial movement of said sleeves over said beaded ends and movement of said sleeves into axially opposed relation over said coupling member; sealing rings adapted to be mounted on said tubing opposite the ends of said coupling member; said sleeves having inclined internal surfaces extending longitudinally thereof for radially compressing said rings against said tubing; said coupling member having inclined surfaces extending longitudinally from opposite ends thereof for engaging said inclined surfaces of said sleeves; said sleeves having end portions extending axially from said ends of said coupling member; said end portions having internal surfaces extending longitudinally thereof in substantially parallel relation to said tubing for radially compressing said rings against said tubing; means engaged with said sleeves and extending inwardly therefrom to prevent dislodgment of said last named sealing rings; and securing means engageable with said sleeves for holding said sleeves in place on said coupling member.

7. A coupling for forming a flexible fluid tight joint between the beaded ends of tubing comprising: a sectional coupling member constructed to be assembled as a tube around said beaded ends; said coupling member having inwardly directed flanges formed with rounded surfaces for engaging the beads on said ends to preclude axial separation of said ends and to radially space the remainder of said coupling member from said tubing; said coupling member having a circumferential groove exteriorly thereof; a sealing ring in said groove; a pair of sleeves movable over said tubing into axially opposed relation to hold said coupling member in assembled relation on said tubing with the end portions of the sleeves engaged with said sealing ring; a pair of sealing rings adapted to be mounted on said tubing; said sleeves having internal inclined surfaces for initially radially compressing said pair of rings; said sleeves having other inclined surfaces for holding sealing rings under radial pressure between the sleeves and the tubing; flanges on said sleeves; split rings adapted to be mounted over said tubing between said flanges on said sleeves and said last named sealing rings; said split rings being engaged with said sleeves and radially spaced from said tubing; and means for releasably holding said sleeves in place over said coupling member.

8. A coupling for forming a flexible fluid tight joint between the beaded ends of tubing comprising: a tubular coupling member divided axially so that it may encircle said beaded ends; said coupling member having inwardly directed flanges formed with rounded surfaces for engaging the beads on said ends to preclude axial separation of said ends; a pair of sleeves having an inside diameter permitting free axial movement of said sleeves over said beaded ends and movement of said sleeves into axially opposed relation over said coupling member; said coupling member having a circumferential external groove; a sealing ring mounted in said groove to form a seal between opposed ends of said sleeves and said coupling member; said sleeves contacting said coupling member only at points between the ends of the sleeves; said sleeves having internal surfaces spaced axially from the ends of said coupling member and radially spaced from said tubing; said internal surfaces being inclined so as to converge with said tubing in a direction toward the outer ends of said sleeves; sealing rings between the tubing and said internal surfaces of said sleeves; inwardly directed flanges on the outer ends of said sleeves; split rings surrounding said tubing ends for cooperation with said flanges to prevent dislodgment of said sealing rings; and securing means engageable with said sleeves for holding said sleeves in place on said coupling member.

9. A coupling for forming a fluid tight joint between the beaded ends of tubing comprising: a coupling member for encircling the ends of the tubing and having internal flanges engageable with the tubing beads to prevent axial separation thereof; a pair of axially opposed sleeves having contiguous portions overlying said coupling member; said sleeves having end portions spaced from said coupling member; sealing elements disposed in said end portions for sealing contact with said tubing ends; means for connecting said sleeves together against axial separation; said coupling member being arched axially between said flanges; said arched portion of said coupling member being radially spaced from said beads and said tubing; said sleeves having complementally arched internal surfaces sealingly engaged with said coupling member; and a sealing ring encircling said coupling member; said sleeves having opposed end portions sealingly engaged with said latter sealing ring; said end portions of said sleeves having internal surfaces substantially parallel with the surface of the tubing opposed thereto; said sleeves having inclined internal surfaces; said coupling member having surfaces at the ends thereof inclined in correspondence with the inclined surfaces of said sleeves and engaged therewith.

10. A coupling for forming a fluid tight joint between the beaded ends of tubing comprising: a coupling member for encircling the ends of the tubing and having internal flanges at its ends engageable with the tubing beads to prevent axial separation thereof; said coupling member being radially spaced from said beads and said tubing throughout the portion thereof between said flanges; a pair of axially opposed sleeves having contiguous portions overlying said coupling member; said sleeves having end portions spaced from said coupling member; sealing elements disposed in said end portions for sealing contact with said tubing ends; means for connecting said sleeves together against axial separation; said sleeve connecting means including a threaded collar; said collar and one of said sleeves having radially extended opposed shoulders; and means on the other sleeve threadedly engaged with said collar for drawing the sleeves axially toward one another upon rotation of said collar in one direction; said contiguous portions of said sleeves having internal surfaces inclined with respect to the axis of said coupling member; said end portions of said sleeves having internal surfaces which converge with said tubing in a direction toward the ends of said sleeves; said coupling member having inclined surfaces at its ends engageable with said convergent surfaces of said sleeves.

11. A coupling for forming a fluid tight joint between the beaded ends of tubing comprising: a coupling member for encircling the ends of the tubing and having internal flanges engageable with the tubing beads to prevent axial separation thereof; a pair of axially opposed sleeves having contiguous portions overlying said coupling member; said sleeves having end portions spaced from said coupling member; sealing elements disposed in said end portions for sealing contact with said tubing ends; said end portions having internal surfaces inclined with respect to the axis of said sleeves for engaging the outer peripheries of and radially compressing said sealing elements; and means for connecting said sleeves together against axial separation; one of said sleeves having a radially extended shoulder; the other of said sleeves being threaded on its outer periphery; said connecting means including a collar threadedly connected to said other sleeve and having a shoulder disposed in engagement with said shoulder for drawing said sleeves toward one another upon relative rotation of said collar and threaded sleeve in one direction; said inclined surfaces of said sleeves being disposed to converge with the outer surface of said tubing in a direction toward the outer ends of the sleeves.

12. A coupling for forming a fluid tight joint between adjacent, substantially axially aligned beaded ends of tubing comprising: a coupling member for encircling each of the adjacent ends of the tubing and bridging the gap therebetween, said member having internal flanges at each of its ends engageable with the tubing beads to prevent axial separation thereof; said coupling member being radially spaced from said beads and said tubing throughout the portion thereof between said flanges; a pair of axially opposed sleeves having contiguous portions overlying said coupling member; said sleeves having end portions extending axially beyond the ends of said coupling member; said coupling member having external surfaces with a component thereof projecting in a radial direction from the ends of said coupling member; said sleeves having parts disposed about said coupling member and having surfaces with a component thereof projecting radially inwardly and complemental to the surfaces of said coupling member and engaged in clamping relation therewith; sealing elements disposed in said end portions for sealing contact with said tubing at points spaced from said beaded ends; said end portions having thereon parts projecting toward said tubing at the opposite side of said sealing elements from said flanges on said coupling member; means for connecting said sleeves together against axial separation; and means forming a seal between said sleeves.

13. A coupling as defined in claim 12 wherein said last named sealing means includes a resilient sealing ring between said sleeves and said coupling member.

14. A coupling as defined in claim 12 wherein said pair of axially opposed sleeves have radially outwardly extending flanges on their contiguous portions to cooperate with said connecting means.

15. A coupling as defined in claim 14 wherein said connecting means includes a pair of cooperatively threaded collars encircling said sleeve flanges and having radially inwardly projecting shoulders engaged with said sleeve flanges for drawing the flanges toward one another upon relative rotation of said collars in one direction.

References Cited in the file of this patent
UNITED STATES PATENTS

| | | |
|---|---|---|
| 1,622,768 | Cook | Mar. 29, 1927 |
| 1,783,410 | Cowell | Dec. 2, 1930 |
| 1,988,694 | Mallay | Jan. 22, 1935 |
| 2,215,659 | Bacon | Sept. 24, 1940 |
| 2,562,359 | Iredell | July 31, 1951 |
| 2,781,207 | Detweiler | Feb. 12, 1957 |
| 2,826,437 | Detweiler | Mar. 11, 1958 |
| 2,918,313 | Lazar | Dec. 22, 1959 |